United States Patent [19]

Ito et al.

[11] 4,201,993

[45] May 6, 1980

[54] INK JET PRINTER USING INFLAMMABLE INK

[75] Inventors: Syoichi Ito, Ibaraki; Mithuo Suzuki, Hitachi, both of Japan

[73] Assignee: Hitachi, Ltd., Japan

[21] Appl. No.: 972,216

[22] Filed: Dec. 22, 1978

[51] Int. Cl.$^2$ .............................................. G01D 15/18

[52] U.S. Cl. ........................................ 346/75; 361/58; 361/226

[58] Field of Search ..................... 346/75; 361/58, 226

[56] References Cited

U.S. PATENT DOCUMENTS 3,496,413 2/1970 Goodridge .......................... 361/226

4,035,812 7/1977 Breeman ............................... 346/75

OTHER PUBLICATIONS

Haskell et al., Deflecting Plate Assembly for Multiple Ink Jet Printer, IBM Tech. Disc. Disclosure, vol. 12, No. 11, Apr. 1970, p. 2001.

Naylor et al., Ink Jet High-Voltage Power Supply; IBM Tech. Disc. Bulletin, vol. 15, No. 4, Sep. 1972, pp. 1371-1372.

*Primary Examiner*—Joseph W. Hartary

*Attorney, Agent, or Firm*—Craig and Antonelli

[57] ABSTRACT

An ink jet printer provides a nozzle for ejecting droplets of inflammable ink towards a recording surface and a charging electrode for imparting a charge to the droplets in accordance with information to be printed. Deflecting electrodes are positioned between the charging electrode and the recording surface. A deflecting source supplies the deflecting plates with a predetermined deflecting voltage. A resistor is connected between one of the deflecting plates and the deflecting source.

5 Claims, 3 Drawing Figures

INK JET PRINTER USING INFLAMMABLE INK

BACKGROUND OF THE INVENTION

1. Field of the Invention

This invention relates to an ink jet printer and more particularly to an electrostatic deflecting ink jet printer using inflammable ink.

2. Description of the Prior Art

The ink used with an ink jet printer is required to have characteristics suitable for formation and control of ink droplets and, in addition, a high ability to attach to the recording surface, to dry immediately after recording and to resist the weather for a long period of time after recording. Especially, a high ability to attach, dry and resist the weather is required in the case where the recording surface is made of a metal or plastics. Generally, such characteristics are attained by using an inflammable ink with a solvent including alcohol such as ethyl alcohol. In the ink jet printer using inflammable ink, part of the ink emitted from a nozzle toward the recording surface is vaporized. Deflecting plates impressed with a high voltage are located downstream of the nozzle in order to deflect the ink droplets. The deflecting plates, if ink, dust or like is attached thereto, are likely to generate a spark discharge. If a spark discharge is generated for this reason or other, the vaporized inflammable ink is liable to burn.

The technique of coating a thin insulating material on the deflecting plates in order to prevent spark discharge is already disclosed by J. W. Haskell, M. P. Marcus and D. A. Walker "Deflecting Plate Assembly for Multiple Ink Jet Printer", I.B.M Technical Disclosure Bulletin, Vol. 12, No. 11, April 1970. The coating of the deflecting plates, however, has the disadvantages of complicating the construction on the one hand and reducing the potential of the deflecting plates on the other hand.

SUMMARY OF THE INVENTION

Accordingly, it is an object of the present invention to provide an ink jet printer high in safety, in which the vapor of inflammable ink generated in operation is hard to burn.

Another object of the present invention is to provide an ink jet printer with a simple construction which is capable of achieving the above object.

One feature of the present invention lies in that a resistor is inserted between a pair of deflecting plates to deflect the charge ink droplets and a deflecting source to supply a predetermined deflecting voltage with the deflecting plates, and the amount of the resistance is so selected that the spark ignition energy discharge when the spark ignition occurs between the deflecting plates is less than the minimum spark ignition energy of the inflammable ink vapor occurred in operation.

DESCRIPTION OF THE PREFERRED EMBODIMENTS

Figure 1:
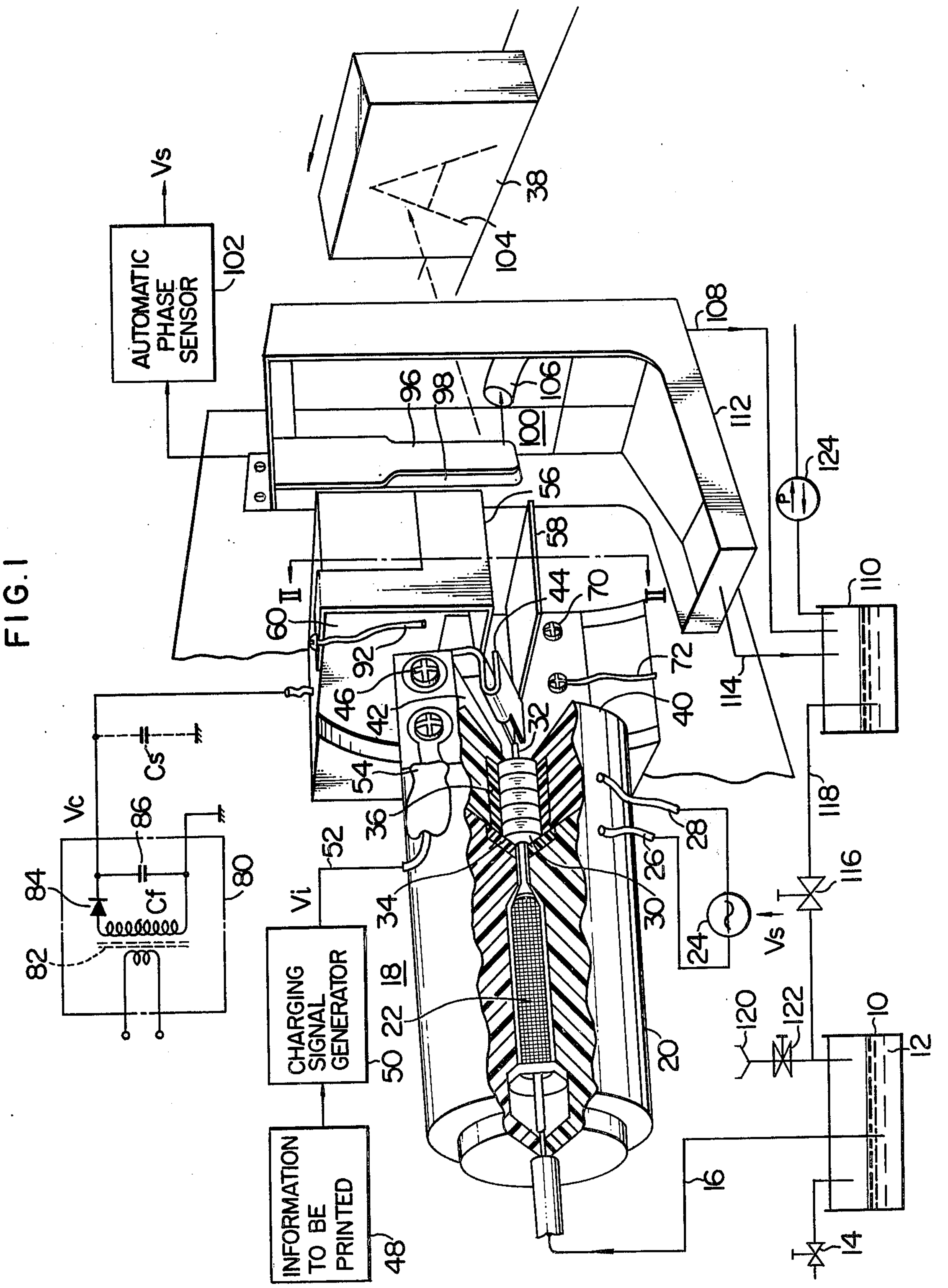
FIG. 1 is a partly cut-away perspective view of an embodiment of the present invention.

In FIG. 1, ink 12 stored in an ink reservoir 10 is pressurized by the air under pressure supplied through a valve 14. The pressurized ink is supplied to a droplet producer 18 through a conduit 16. The ink 12 is inflammable and comprised of, for example, alcohol 60%, cyclohexane 35% as main components, and a dye and an additive for providing conductivity. The ink droplet producer 18 comprises an ink filter 22 contained in a circular plastic container 20, a piezoelectric crystal 30 connected to a high frequency source 24 by wires 26 and 28, and a nozzle 32. Packings 34 and 36 are inserted between the piezoelectric crystal 30 and the plastic housing 20 for absorbing vibrations. The nozzle 32 surrounded by the piezoelectric crystal 30 is vibrated mechanically and injects toward the recording surface 38 the ink passed through the ink filter 22, thus forming a series of ink droplets at regular intervals. A charging electrode 44 is mounted with the screw 46 on the insulating block 42 fixed at the end 40 of the plastic housing 20. In accordance with the information 48 to the printed to the recording surface 38, the charging signal generator 50 generates a voltage signal Vi representing the print position of each droplet. This voltage signal Vi is applied through the terminal 54 to the charging electrode 44. The ink droplets 44 emitted from the nozzle 30 are charged to the amount corresponding to the voltage signal Vi while passing through the charging electrode 44 disposed downstream of the nozzle 30.

Figure 2:
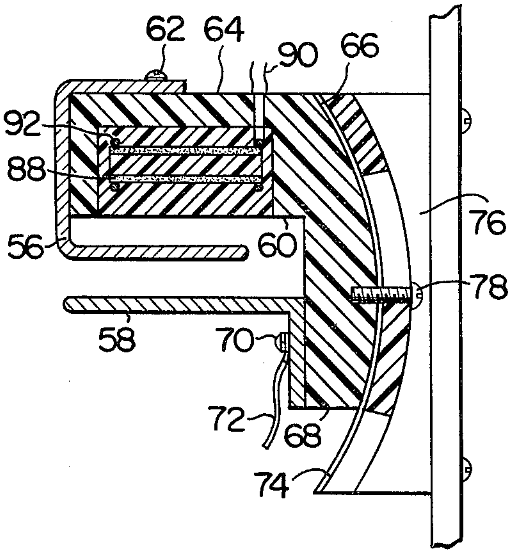
FIG. 2 is a sectional view along the line II—II in FIG. 1.

A pair of deflecting plates 56, 58 are opposedly disposed downstream of the charging electrode 44. As shown in detail in FIG. 2, the first insulating support 60 includes a horizontal portion 64 on which one of the deflecting plates 56 is fastened with screw 62, and a vertical portion 68 having the curved surface 66. Another deflecting plate 58 is mounted on the vertical portion 68 with screw 70 and at the same time grounded through the wire 72. The first insulating support 60 is, as shown in FIG. 2, fixed with screw 78 to the second insulating support 76 formed on the curved surface 74. When the screw 78 is loosened, the first insulating support 60 is free to slide on the curved surface 74 of the second insulating support 76. As a result, it is possible to adjust the direction of deflection of the deflecting electrodes 56 and 58. The adjustment of the direction of deflection compensates for the deformation of the printed information on the recording surface 38 as described in U.S. Pat. No. 3,813,676. The deflecting source 80 for generating a predetermined deflecting voltage Vc includes a transformer 82 connected to a commercial power supply, a rectifying diode 84, and a filter condenser 86 connected to the output terminal of the diode 84. The output voltage Vc of the deflecting source 80 is connected to one terminal 90 of the resistor 88. The other terminal 92 of the resistor 88 is connected to the deflecting electrode 56. In order to reduce the stray capacitance between the deflecting electrode 58 and the resistor 88, the resistor 88 is disposed in proximity to the deflecting electrode 46. As noted from FIG. 2, the resistor 88 is integrally molded in the horizontal portion 64 of the first insulating support 60 supporting the deflecting electrode 56.

Downstream of the deflecting electrodes 56 and 58, the ink drop sensor 100 including a pair of plates 96 and 98 is disposed. The automatic phase sensor 102 generates a synchronous signal Vs when an ink droplet passes between the pair of plates 96 and 98. In response to this synchronous signal Vs, the phase of the high frequency source 24 is adjusted, thus regulating the vibrations of the piezoelectric crystal 30, as disclosed, for example, in U.S. Pat. No. 3,836,912. The ink droplet deflected by the deflecting plates 56 and 58 flies in the manner shown in FIG. 1 and prints the visible information 104 on the recording surface 38 moving in the direction of arrow. The amount of deflection of the ink droplet is proportional to the amount of charge thereof. The ink droplets not required for printing are caught by the waste catcher 106 without being deflected, and through the conduit 108 returned to the recovery tank 110. The ink overflowing from the waste catcher 106 is recovered in the overflow tank 112, and through the conduit 114, returned into the recovery tank 110. The recovery tank 110 communicates with the ink reservoir 10 by the conduit 118 having the valve 116. The funnel 120 for refilling ink is connected to the conduit 118 through the valve 122. When the ink 12 is refilled in the reservoir 10, the valve 116 is closed while the valve 122 is opened. In operation, the valves 116 and 122 are closed and the pressure in the recovery tank 110 is reduced to negative by the air pump 124, so that ink is absorbed from the waste catcher 106 and the overflow tank 112. After operation stops, the valve 14 is closed and the valve 116 opened, with the result that the air under pressure is returned into the recovery tank from the air pump 124. Thus the ink in the recovery tank is returned to the ink reservoir 10 through the valve 116.

The inflammable ink vapor generated during operation of the ink jet printer is floated around the deflecting electrodes 56 and 58. This vapor burns if the energy Es discharged when a spark discharge is generated between the deflecting plates exceeds the minimum spark ignition energy Emin. The minimum spark ignition energy Emin depends on the composition, concentration, pressure and temperature of the inflammable ink vapor. As explained with reference to the embodiment, in the case of the ink containing ethyl alcohol 60% and cyclohexane 35% as main components, the minimum spark ignition energy in the concentration range from 4.3 to 19% by volume and temperature of 35° C. under atmosphere pressure is about $0.28\times10^{-3}$ Joules when the deflecting voltage Vc is 4 KV, and $0.32\times10^{-3}$ for the deflecting voltage of 6 KV.

The capacitance Co between the deflecting plates 56 and 58 reaches a level of a high voltage equivalent to the deflecting voltage Vc in operation. When spark discharge is generated between the deflecting plates, the charges of the capacitance Co are released completely within the short time Ts of several microseconds. The energy $E_1$ discharged from the capacitance Co at that time is equal to the storage energy of the capacitance Co and is expressed by the equation below.

$$E_1=\tfrac{1}{2}\mathrm{Co}\ Vc^2 \quad (1)$$

The energy $E_2$ discharged between the deflecting plates through the resistor 88 during the discharging time Ts, on the other hand, depends on the resistance of the resistor R and is expressed by the equation below.

$$E_2=f(\mathrm{R}) \quad (2)$$

As explained below, f(R) is a function decreasing with the increase in resistance R. Therefore, the total energy discharged during the discharging time Ts is expressed by the equation below.

$$E_s=E_1+E_2=\tfrac{1}{2}Vc^2\ Co+f(R) \quad (3)$$

$$E_1=\tfrac{1}{2}Co\ Vc^2=E_s-f(R) \quad (4)$$

In the above-mentioned embodiment, the amount of the resistance R is selected to satisfy the relation below in order to reduce the energy Es below the minimum spark ignition energy Emin of the vapor.

$$E_1\mathrm{max}=\tfrac{1}{2}Vc^2\ \mathrm{Comax}<\mathrm{Emin}-f(R) \quad (5)$$

where $E_1$max is the maximum storage energy of the capacitance Co, and Comax the amount of the capacitance Co associated with the maximum storage energy of the capacitance Co, the value Comax depending on the amount of the resistance R. Since f(R) is larger than zero, it is required that Emin be larger than $E_1\mathrm{max}=\tfrac{1}{2}\mathrm{Vc}^2$ Comax if equation (5) is to be established. For this purpose, in the above-mentioned embodiment, the amount of capacitance Co is so selected that the electrostatic energy stored between the deflecting plates 56 and 58 when a predetermined deflecting voltage Vc is applied to the deflecting plates 56 and 58 is less than the minimum spark ignition energy Emin of the inflammable ink vapor occurred in operation.

Figure 3:
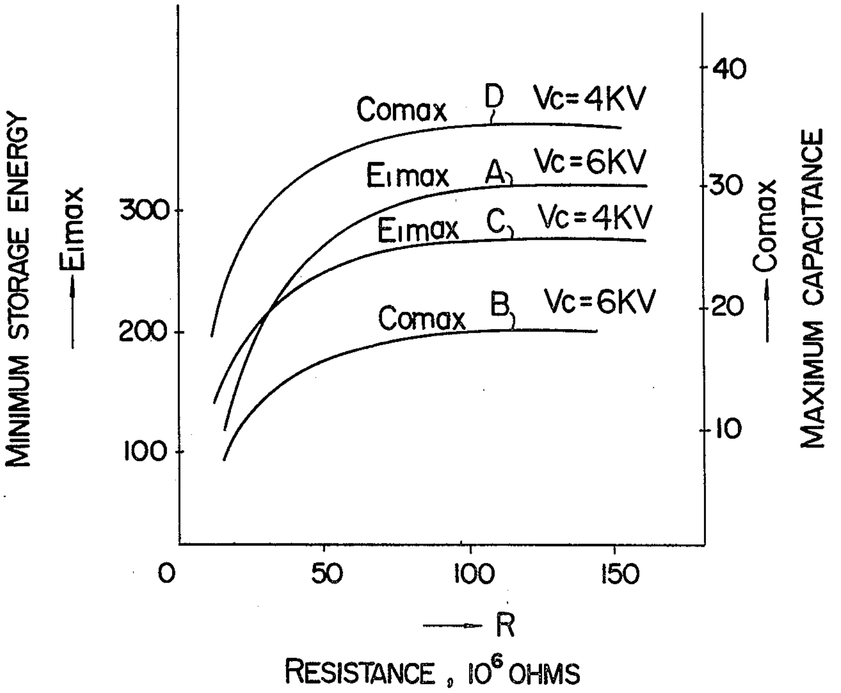
FIG. 3 is a graph showing the relation of the amount of resistance with the maximum storage energy and the maximum capacitance of the deflecting plates.

The graphs A and B in FIG. 3 show the maximum storage energy $E_1$max and the maximum capacitance Comax respectively as the amount of resistance R is changed at the deflecting voltage Vc of 6 KV. The graphs C and D, on the other hand, represent $E_1$max and Comax respectively at the deflecting voltage Vc of 4 KV.

Regardless of whether the deflecting voltage Vc is 6 KV or 4 KV, the maximum storage energy $E_1$max and the maximum capacitance Comax increase with the resistance R and are stabilized at a certain value. This is for the reason that as long as the resistance R is small, a large discharge current flow through the resistance R and f(R) in equation (5) is increased, while as long as the resistance R is large, the discharge current is small and the value f(R) is reduced.

The maximum storage energy $E_1$max and the maximum capacitance Comax at the deflecting voltage Vc of 6 KV and the resistance R of 50 MΩ take the values of $0.27\times10^{-3}$ Joules and 15 PF respectively as noted from graphs A and B of FIG. 3. In the embodiment of FIG. 1, there was no danger of the vapor burning at all when Vc is 6 KV, Cs 25 PF, Cf 2200 PF, Co 3 PF and R 50 MΩ. In this case the storage energy of the deflecting plates 56 and 58 was $\tfrac{1}{2}\times3\times10^{-12}\times6^2\times10^6=0.054\times10^{-3}$ Joules, which was a value much lower than the maximum storage energy.

We claim:

1. An ink jet printer using inflammable ink comprising:
   an ink reservoir for storing ink including inflammable solvent;
   means for supplying the inflammable ink under predetermined pressure;
   a nozzle for ejecting the ink received from the ink supplying means and forming a series of ink droplets;
   means mounted downstream from the nozzle for charging each ink droplet;

charging signal generator for producing a voltage signal in accordance with information to be printed to determine an amount of charge to be imparted to each ink droplet and for supplying the charging means with the voltage signal;

a pair of deflecting plates mounted downstream from the charging means for deflecting the charged ink droplets, the value of the capacitance is so selected that the electrostatic energy stored betwen the plates when a predetermined d.c. voltage is supplied thereto, is less than the minimum spark ignition energy of the inflammable ink vapor occured in operation;

an electric source for supplying the deflecting plates with the predetermined d.c. voltage;

an insulating support for supporting the deflecting plates;

a resistor connected between the deflecting plates and the electric source, the value of the resistance is so selected that the spark ignition energy discharged when the spark ignition occurs between the deflecting plates, is less than the minimum spark ignition energy.

2. An ink jet printer using inflammable ink as claimed in claim 1, whereby said resistor is mounted on the insulating support and adjacent to the deflecting plates.

3. An ink jet printer using inflammable ink as claimed in claim 2, wherein said insulating support comprises;

a first insulating support for mounting the deflecting electrodes thereon; and a second insulating support for movably mounting said first insulating support thereon to adjust the deflecting direction.

4. An ink jet printer using inflammable ink as claimed in claim 3, wherein said first insulating support includes a horizonatal portion and a vertical portion, one of the deflecting electrodes is secured to the horizontal portion and the other is secured to the vertical portion.

5. An ink jet printer using inflammable ink as claimed in claim 4, wherein the resistor is molded in the horizontal portion of said first insulating support.

* * * * *